United States Patent
Petermann

(10) Patent No.: US 8,340,391 B2
(45) Date of Patent: Dec. 25, 2012

(54) DOCUMENT INPUT MODULE

(75) Inventor: Udo Petermann, Altenbeken (DE)

(73) Assignee: Wincor Nixdorf International GmbH (DE)

( * ) Notice: Subject to any disclaimer, the term of this patent is extended or adjusted under 35 U.S.C. 154(b) by 332 days.

(21) Appl. No.: 12/739,025

(22) PCT Filed: Nov. 12, 2008

(86) PCT No.: PCT/EP2008/009524
§ 371 (c)(1),
(2), (4) Date: Apr. 21, 2010

(87) PCT Pub. No.: WO2009/074201
PCT Pub. Date: Jun. 18, 2009

(65) Prior Publication Data
US 2010/0310148 A1 Dec. 9, 2010

(30) Foreign Application Priority Data
Dec. 10, 2007 (DE) .................... 10 2007 059 410

(51) Int. Cl.
*G06K 9/00* (2006.01)

(52) U.S. Cl. ........ 382/139; 382/100; 382/137; 382/138; 382/135

(58) Field of Classification Search .................. None
See application file for complete search history.

(56) References Cited

U.S. PATENT DOCUMENTS

| | | | |
|---|---|---|---|
| 3,978,450 A | 8/1976 | Sanner et al. | |
| 5,091,961 A * | 2/1992 | Baus, Jr. ................ | 382/139 |
| 5,495,929 A * | 3/1996 | Batalianets et al. ........ | 194/207 |
| 5,867,585 A * | 2/1999 | Myers ........................ | 382/139 |
| 6,259,808 B1 | 7/2001 | Martinez et al. | |
| 7,010,156 B1 * | 3/2006 | Moore et al. ................ | 382/139 |
| 7,376,257 B2 * | 5/2008 | Nomura ...................... | 382/135 |
| 7,517,163 B1 * | 4/2009 | Addison et al. ............... | 400/73 |
| 2002/0191830 A1 * | 12/2002 | Pidhirny et al. ............. | 382/140 |
| 2003/0081824 A1 * | 5/2003 | Mennie et al. ............... | 382/135 |
| 2004/0136586 A1 * | 7/2004 | Okamura .................... | 382/137 |
| 2005/0041268 A1 * | 2/2005 | Panini ........................ | 358/474 |
| 2005/0047641 A1 * | 3/2005 | Volpa ......................... | 382/137 |
| 2006/0088199 A1 | 4/2006 | Shizuka et al. | |
| 2006/0144923 A1 * | 7/2006 | VanKirk et al. ............. | 235/379 |
| 2006/0182332 A1 * | 8/2006 | Weber ......................... | 382/139 |
| 2007/0098244 A1 | 5/2007 | Franklin et al. | |
| 2008/0273789 A1 * | 11/2008 | Bell et al. .................... | 382/137 |
| 2010/0074510 A1 * | 3/2010 | Lee et al. .................... | 382/139 |
| 2011/0216960 A1 * | 9/2011 | VanKirk et al. ............. | 382/140 |

FOREIGN PATENT DOCUMENTS

EP 1783662 A1 5/2007

* cited by examiner

*Primary Examiner* — Chan S Park
*Assistant Examiner* — Avinash J Yentrapati
(74) *Attorney, Agent, or Firm* — Harness, Dickey & Pierce, P.L.C.

(57) ABSTRACT

A document input module (2) for the input of documents (9, 91, 92, 93) having at least one MICR section (10), with a reading head (3) to read the at least one MICR section (10) relative to a system (8) of input documents (9, 91, 92, 93), characterized in that the document input module (2) has at least one further reading head (4, 5, 6) to read different formats and input positions of input documents (9, 91, 92, 93).

17 Claims, 2 Drawing Sheets

DOCUMENT INPUT MODULE

BACKGROUND OF THE INVENTION

1. Technical Field

The invention relates to a document input module for the input of documents having at least one MICR section and for reading out information from the MICR section.

2. Discussion

Document input modules of this type are used for the magnetic processing of information that is coded and stored on documents in a specific way (MICR=Magnetic Ink Character Recognition). These documents, checks for instance, have MICR sections that, after a document is input into the document input module, are brought together with a reading head that reads out the information stored in the MICR section in the manner of a tape recorder reading head as the document is being transported.

Magnetic processing of documents using MICR sections requires a specific alignment of the documents, for instance to a system edge. It is furthermore necessary that the documents be input in a specific position.

If the input is incorrect, or positioned differently, the document is rejected so that a new—in this case correct—input must be undertaken. In addition, different document input modules are usually necessary for different document format sizes.

SUMMARY OF THE INVENTION

It is, therefore, the object of the present invention to create a document input module for the input of documents having different formats and with a greater selection of options for positioning.

A basic concept of the invention is that the document input module is equipped with at least one further reading head.

The advantageous result is that different formats can be read with an optional input position for input documents.

The potential variance in position of the MICR sections is accommodated simply by covering a corresponding range of variance with one or multiple fixed reading heads. An array of further reading heads corresponds to different formats and input positions of input documents.

The array of further reading heads can be offset next to each other in one line perpendicular to a transport direction of input documents or—especially advantageous—offset among themselves. Both are also possible, which covers a large number of different document formats. The array of the reading heads in an offset arrangement in different rows results in a particularly advantageous readout since the noise characteristics of the reading heads is minimized in this arrangement.

The relative arrangement of the reading heads is therefore configured in such a way as to ensure that the MICR section is always located in a readable and definite position under an appropriate reading head when an input document is transported in the document input module. For this purpose, a pressure roller can be assigned to each reading head.

Furthermore, a pre-magnetizer is assigned to each reading head, possibly consisting of one or more permanent magnets or pre-magnetizer heads that can be part of the reading heads, for instance.

A further embodiment utilizes a document input module for the input of documents having at least one MICR section and at least one reading head to read the at least one MICR section, wherein the document input module is configured both to read MICR sections that are located on the upper side and to read MICR sections that are located on the underside of input documents.

This embodiment permits the reading or evaluation respectively of checks with MICR sections even if they are input "reversed", that is to say with the MICR sections on the side of the paper facing away from the reading head.

It is not necessary to locate reading heads in the document input module on both sides of the input path for the checks, instead it is sufficient for many types of documents with MICR sections—depending on their quality—to locate one or more reading heads on only one side of the document input module and to furnish said module with a computing unit assigned to the document input module having an evaluation or conversion program, wherein the computing unit can be integrated into the module or into a parent device. The evaluation or conversion program is designed to recognize MICR sections, or their MICR writing, "through the paper" on the side of input documents facing away from the reading heads or to convert said sections or writing into MICR signals that are not "upside down" but are aligned in the normal way.

The combination of an array of multiple reading heads on one side of the checks to be input appears to be optimal to great extent since it is possible with such an arrangement to read checks of different formats and with a different MICR arrangement as well as checks that are input with the writing on the side facing away from the reading head.

The readout can also be accomplished by positioning further reading heads that lie opposite the first reading heads on the other side of the paper.

Processing of the MICR sections in all positions of the corresponding document formats is thus achieved through the suitable arrangement of reading heads. In contrast to the prior art, rejection of documents "incorrectly" input, and the associated loss of time and possible damage resulting from their hanging up when they are re-issued from the document input module, is thus avoided.

BRIEF DESCRIPTION OF THE DRAWINGS

The invention is now explained in more detail using embodiments with reference to the appended drawings.

DESCRIPTION OF THE PREFERRED EMBODIMENTS

Figure 1:
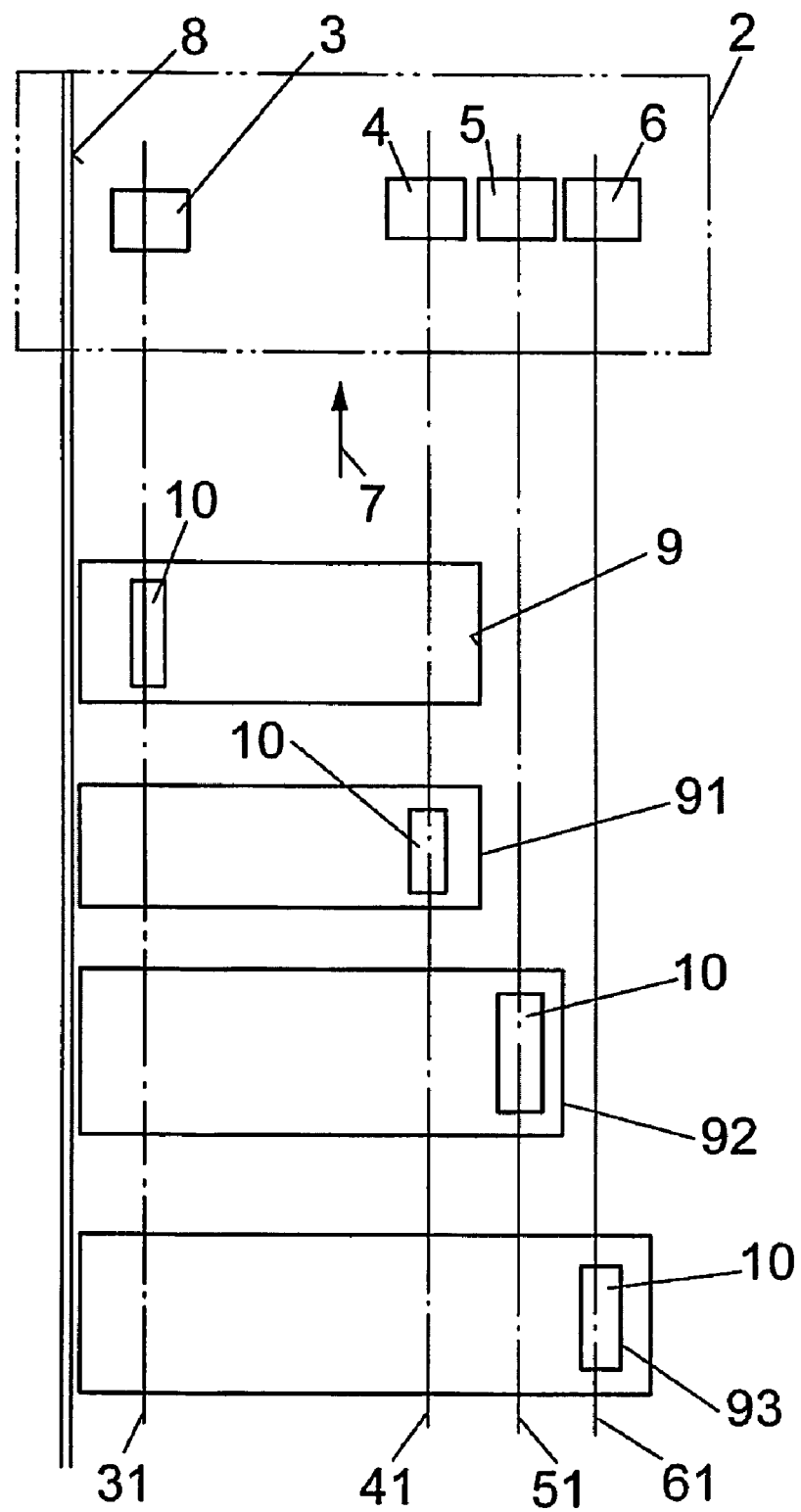
FIG. 1 shows a schematic view of a first embodiment of a document input module in accordance with the invention in conjunction with different document formats.

The same components or functional elements having the same function are identified with the same reference numerals in the Figures.

FIG. 1 shows a first embodiment of a document input module 2 in accordance with the invention in conjunction with documents 9, 91, 92, 93 with different formats. Documents 9, 91, 92, 93 are, for instance, checks with applied MICR sections 10. The MICR sections 10 have characters that consist of magnetizable ink and carry specifiable information.

The document input module 2 is equipped with reading heads 3, 4, 5, 6 for processing the MICR sections 10 on the documents 9, 91, 92, 93 that read the magnetically applied information on the MICR sections 10 in the manner of a magnetic tape reading head. To do this, a document 9, 91, 92, 93 is input into the document input module 2 in a transport direction 7, wherein the MICR sections 10 lie on the top and are transported in said module so that the MICR section 10 passes under one of the reading heads 3, 4, 5, 6 as the document 9, 91, 92, 93 is transported, and the information on the MICR section is read out.

An alignment of the document 9, 91, 92, 93 to be input is necessary for such processing. This is the purpose of a system 8, which can be an edge, for instance. The system 8 is extended all the way down in FIG. 1 to clarify that all documents 9, 91, 92, 93 have to be placed against this system 8. The system 8 runs parallel to the transport direction 7.

The MICR sections 10 in this example are disposed parallel to the transport direction 7 on documents 9, 91, 92, 93. While documents 9, 91, 92, 93 are being transported, said sections remain parallel to the transport direction 7 along a reading line 31, 41, 51, 61 that corresponds to a reading direction of a reading head 3, 4, 5, 6.

Different formats and positions of documents 9, 91, 92, 93 are shown in FIG. 1. First document 9 has an MICR section 10 that is located on the left and is read by first reading head 3. Now, it is possible that first document 9, as second document 91, has its MICR section 10 on the right side, which can happen if first document 9 is input rotated by 180° around the vertical axis on the drawing. MICR section 10 then lies on reading line 41 of second reading head 4.

A third document 92 has a longer format than the first and rotated second document 9, 91. MICR section 10 located further to the right lies on reading line 51 of third reading head 5. The MICR section of a fourth document 93 with an even longer format cooperates on reading line 61 with fourth reading head 6 to read the MICR information.

Four reading heads 3, 4, 5, 6 are shown in an arrangement 1 in this first embodiment. Reading heads 3, 4, 5, 6 are disposed in a line perpendicular to the transport direction 7 and to each other and placed in each case at a specific distance to system 8 which corresponds to the different document formats and possible ways of inputting.

Naturally, third and fourth documents 92, 93 can be input in such a way that MICR section 10 lies on reading line 31 of first reading head 3. In this way, optional input of documents 9, 91, 92, 93 having different formats is possible, wherein the left edge of each document 9, 91, 92, 93 lies against system 8 for alignment.

Figure 2:
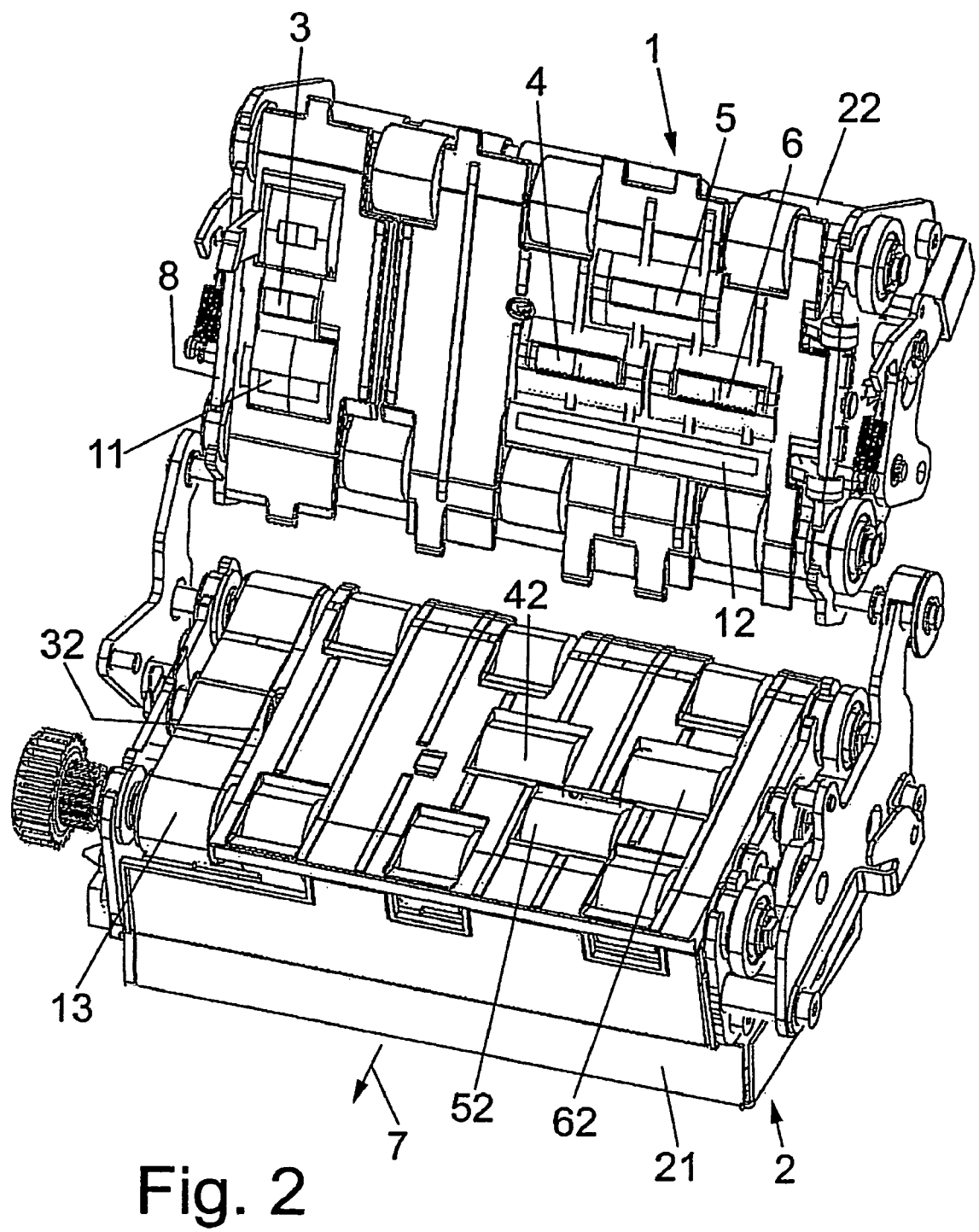
FIG. 2 shows a perspective view of a second embodiment of the document input module in accordance with the invention.

FIG. 2 shows a perspective view of a second embodiment of the document input module 2 in accordance with the invention, with an upper part 22 that can be swung down and locked to a lower part 21. The transport direction here runs to the left at the bottom.

In this second embodiment, four reading heads 3, 4, 5, 6 in upper part 22 are disposed perpendicular to transport direction 7. Three reading heads 4, 5, 6 are placed staggered along one line. Second and fourth reading head 4 and 6 lie in one row with first reading head 3 perpendicular to transport direction 7. Third reading head 5 is offset by a distance to this row in transport direction 7 and located above a space between second and fourth reading head 4 and 6.

Pre-magnetizers 11, 12 are mounted in transport direction 7 ahead of respective reading heads 3, 4, 5, 6 to magnetize MICR sections 10 of input documents 9, 91, 92, 93. Second pre-magnetizer 12 is provided to cooperate with second to fourth reading heads 4, 5, 6. Pre-magnetizers 11, 12 can be permanent magnet components of reading heads 3, 4, 5, 6.

An input document 9, 91, 92, 93 is moved through by means of a transport device 13, for instance with a transport belt and assigned transport rollers, under reading heads 3, 4, 5, 6, wherein a pressure roller 32, 42, 52, 62 in lower part 21 lying opposite each reading head 3, 4, 5, 6 is assigned to said reading head, said roller generating a specifiable pressure of the MICR section 10 against the specific reading head 3, 4, 5, 6 whereby noise from the reading head 3, 4, 5, 6 is reduced.

The invention is not restricted to the embodiments described above. It can be modified within the framework of the appended claims.

It is conceivable that documents 9, 91, 92, 93 can be input with MICR sections 10 underneath, where MICR sections 10 are then taken past the individual reading head 3, 4, 5, 6 with the document material as an interim layer.

It is also possible that further reading heads are located in lower part 21 of the document input module 2 for this purpose.

The reading direction of the MICR sections 10 can be different with a different input position for documents 9, 91, 92, 93. Said reading direction is compensated for by suitable recognition and "rotation" software during the information processing of the signals read by reading heads 3, 4, 5, 6 in a suitable manner.

What is claimed:

1. A document input module for reading MICR sections of documents, the document input module comprising:
    an alignment edge extending parallel to a transport path of the documents;
    a first reading head configured to read the MICR sections, the first reading head is proximate to the alignment edge; and
    a second reading head for reading MICR sections that is distal to the alignment edge and spaced apart from the first reading head to define a gap without reading heads between the first reading head and the second reading head;
    a third reading head for reading MICR sections that is closer to the second reading head than to the first reading head, the second reading head is between the first reading head and the third reading head.

2. The document input module of claim 1, wherein the second reading head is included in a reading head array including the third reading head and a fourth reading head, the gap is defined between the first reading head and the reading head array, and the second, third, and fourth reading heads correspond to different formats and input positions of the documents.

3. The document input module of claim 2, wherein the second, third, and fourth reading heads extend along a line perpendicular to the transport path and the third reading head is between and adjacent to each of the second and the fourth reading heads.

4. The document input module of claim 2, wherein the first, second, and fourth reading heads are aligned along a line perpendicular to the transport path, and the third reading head is offset from the line and between the second and fourth reading heads.

5. The document input module of claim 1, wherein a first pressure roller is arranged opposite to the first reading head, and a second pressure roller is arranged opposite to the second reading head.

6. The document input module of claim 1, wherein a first pre-magnetizer is aligned with the first reading head along the transport path and a second pre-magnetizer is aligned with the second reading head long the transport path.

7. The document input module of claim 1, wherein the document input module is configured to read MICR sections that are located on an upper side and/or an underside of the documents.

8. A document input module for reading MICR sections of documents input therein, the document input module comprising:
- a first reading head for reading at least one MICR section; and
- a reading head array including a second reading head and a third reading head, the reading head array is spaced apart from the first reading head to define therebetween a gap devoid of reading heads;
- wherein the second reading head and the third reading head are closer together than the first reading head and the reading head array; and
- wherein the document input module is configured to read MICR sections located on an upper side of the documents and to read MICR sections located on an underside of the documents.

9. The document input module of claim 7, further comprising a computing device assigned to the document input module with an evaluation program designed to recognize MICR writing on a side of the documents opposite to the first and second reading heads.

10. The document input module of claim 2, wherein the reading head array extends along a line perpendicular to both the transport path of the documents and the alignment edge.

11. The document input module of claim 2 wherein the second and fourth reading heads are aligned along a first line perpendicular to both the transport path and the alignment edge, and the third reading head is aligned with a second line perpendicular to the transport path and the alignment edge, the second line is parallel to and spaced apart from the first line.

12. The document input module of claim 8, further comprising a computing device assigned to the document input module with an evaluation program designed to recognize MICR writing on a side of the documents opposite to the first reading head and the reading head array.

13. The document input module of claim 8, wherein the reading head array further includes a fourth reading head, the third reading head is between and adjacent to both the second reading head and the fourth reading head; and
- wherein the first, second, third, and fourth reading heads are aligned along a line perpendicular to the transport path.

14. The document input module of claim 8, wherein the reading head array further includes a fourth reading head, the third reading head is between the second reading head and the fourth reading head;
- wherein the first, second, and fourth reading heads are aligned along a line perpendicular to the transport path; and
- wherein the third reading head is spaced apart from the line along the transport path.

15. A document input module for reading MICR sections of documents, the document input module comprising:
- an alignment edge extending parallel to a transport path of the documents;
- a first reading head for reading MICR sections, the first reading head is proximate to the alignment edge;
- a reading head array including a second reading head, a third reading head, and a fourth reading head;
- wherein the reading head array is spaced apart from the first reading head to define a gap therebetween devoid of reading heads;
- wherein the first, second, and fourth reading heads are aligned along a line perpendicular to the transport path and the alignment edge;
- wherein the third reading head is between the second and the fourth reading heads, and spaced apart from the line along the transport path; and
- wherein the second and the third reading heads, and the third and the fourth readings heads, are closer together than the first reading head and the reading head array.

16. The document input module of claim 15, wherein the document input module is configured to read MICR sections on both a top surface and a bottom of the documents.

17. The document input module of claim 15, wherein the document input module includes an upper part and a lower part that opposes the upper part;
- wherein the first reading head and the reading head array are both mounted to the upper part of the document input module;
- wherein a first pre-magnetizer is aligned with the first reading head along the transport path, and a second pre-magnetizer is aligned with the reading head array along the transport path, the first and the second pre-magnetizers are mounted to the upper part; and
- wherein a first pressure roller, a second pressure roller, a third pressure roller, and a fourth pressure roller are each mounted to the lower part, the first pressure roller is opposite to the first reading head, the second pressure roller is opposite to the second reading head, the third pressure roller is opposite to the third reading head, and the fourth pressure roller is opposite to the fourth reading head.

* * * * *